(12) United States Patent
Oishi et al.

(10) Patent No.: US 7,168,543 B2
(45) Date of Patent: Jan. 30, 2007

(54) CLUTCH-LEVER MANIPULATION ASSISTING DEVICE

(75) Inventors: Akifumi Oishi, Shizuoka-ken (JP); Yousuke Ishida, Shizuoka-ken (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 0 days.

(21) Appl. No.: 11/185,185

(22) Filed: Jul. 19, 2005

(65) Prior Publication Data

US 2005/0252748 A1 Nov. 17, 2005

Related U.S. Application Data

(62) Division of application No. 10/890,808, filed on Jul. 14, 2004.

(30) Foreign Application Priority Data

Jul. 18, 2003 (JP) ............................. 2003-199227

(51) Int. Cl.
*F16D 23/12* (2006.01)
(52) U.S. Cl. ...................... 192/99 S; 74/489; 74/502.2
(58) Field of Classification Search .............. 192/99 S; 74/501.6, 518
See application file for complete search history.

(56) References Cited

U.S. PATENT DOCUMENTS

| 3,942,609 | A | * | 3/1976 | Hill | 188/24.16 |
| 4,301,694 | A | * | 11/1981 | Costa | 74/518 |
| 4,480,720 | A | * | 11/1984 | Shimano | 188/24.15 |
| 4,773,510 | A | * | 9/1988 | Sato | 188/24.16 |
| 4,817,452 | A | * | 4/1989 | Burkey | 74/522 |
| 5,109,968 | A | * | 5/1992 | Pollitt et al. | 192/83 |
| 5,279,179 | A | * | 1/1994 | Yoshigai | 74/502.2 |
| 5,339,929 | A | * | 8/1994 | Chern | 188/24.16 |
| 5,528,954 | A | * | 6/1996 | Yoshigai | 74/489 |
| 5,540,304 | A | * | 7/1996 | Hawkins et al. | 188/24.15 |
| 5,566,790 | A | * | 10/1996 | Chen | 188/24.16 |
| 5,579,872 | A | * | 12/1996 | Chen | 188/24.16 |
| 5,775,173 | A | * | 7/1998 | Wagner | 74/502.2 |
| 5,819,589 | A | * | 10/1998 | Nakashima et al. | 74/489 |
| 6,186,282 | B1 | * | 2/2001 | Juan | 188/24.16 |
| 6,212,969 | B1 | * | 4/2001 | Kuo | 74/500.5 |
| 6,457,377 | B1 | * | 10/2002 | Hsu | 74/502.2 |
| 6,679,366 | B1 | * | 1/2004 | Tulaczko et al. | 192/99 S |
| 2005/0072648 | A1 | * | 4/2005 | Peppard et al. | 192/99 R |

FOREIGN PATENT DOCUMENTS

JP 07-132872 5/1995

* cited by examiner

*Primary Examiner*—Saul Rodriguez
(74) *Attorney, Agent, or Firm*—Hogan & Hartson LLP

(57) ABSTRACT

A clutch-lever manipulation assisting device includes an input member coupled to a side of a clutch lever, an output member connected to the input member via a connection device and coupled to an operated member of a clutch, and a biasing device that assists a manipulating force by the clutch lever. The connection device is constructed such that a ratio of a moved amount of the output member to a moved amount of the input member varies during a clutch operation.

19 Claims, 13 Drawing Sheets

Fig. 9
(a) 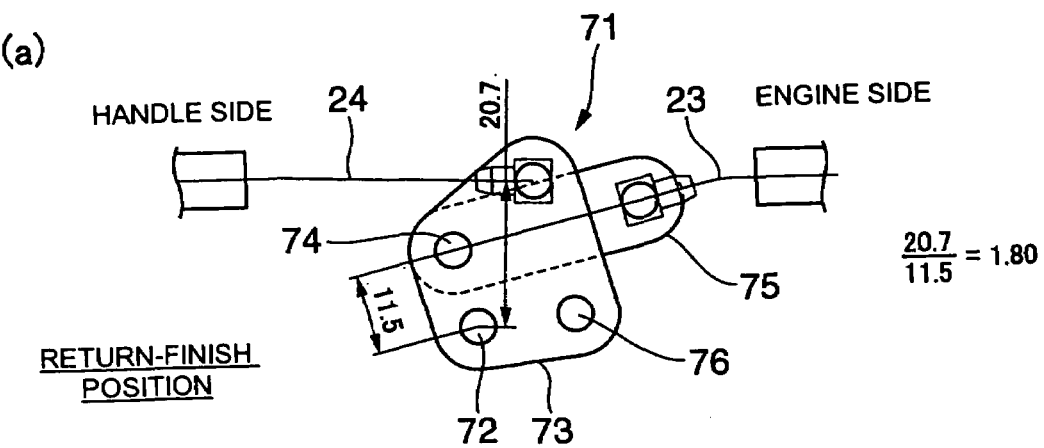
RETURN-FINISH POSITION
$\frac{20.7}{11.5} = 1.80$
(b) 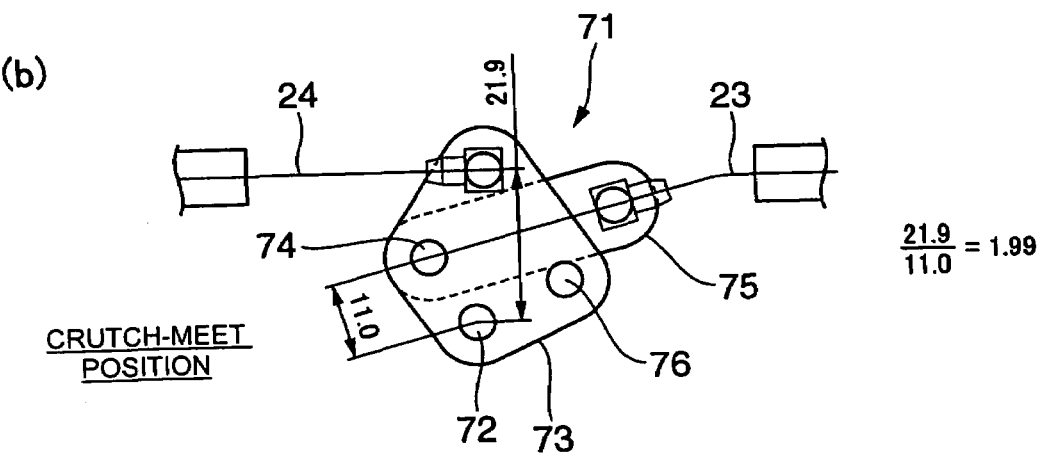
CRUTCH-MEET POSITION
$\frac{21.9}{11.0} = 1.99$
(c) 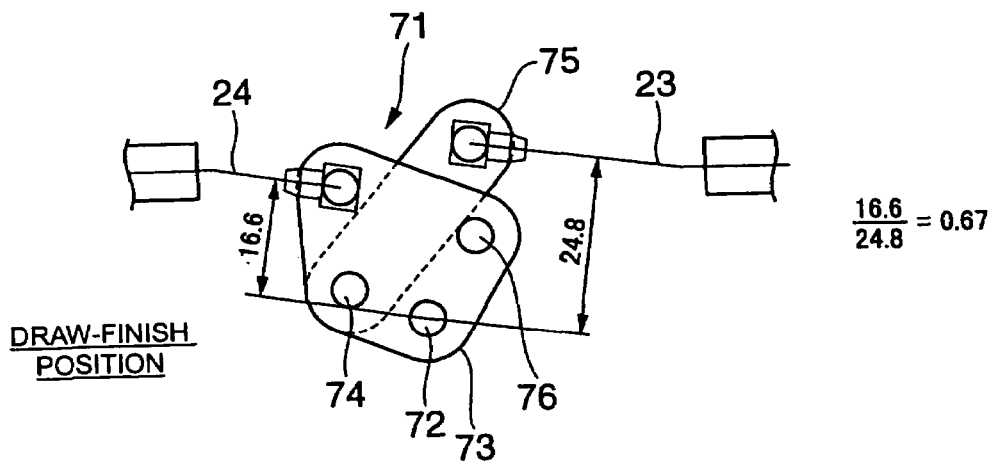
DRAW-FINISH POSITION
$\frac{16.6}{24.8} = 0.67$

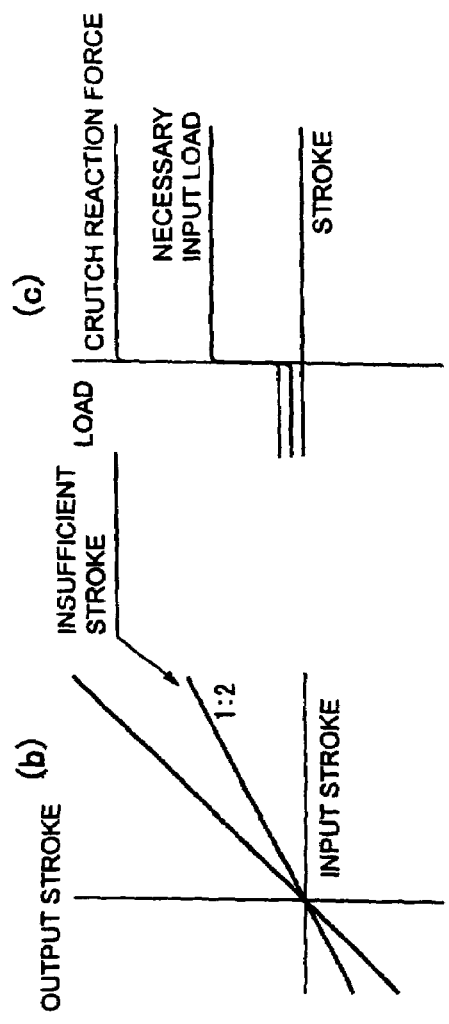
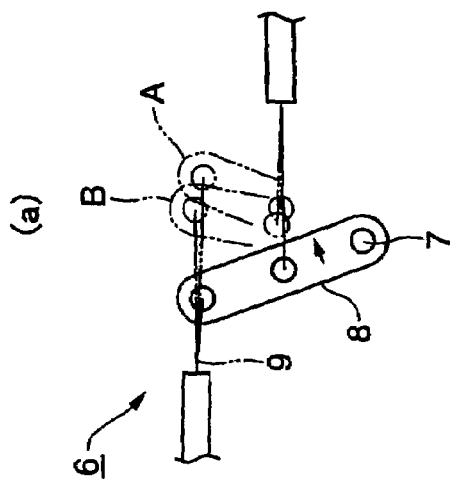
Fig. 13 Prior Art

CLUTCH-LEVER MANIPULATION ASSISTING DEVICE

This is a divisional of application Ser. No. 10/890,808 filed Jul. 14, 2004, which application is hereby incorporated by reference in its entirety.

BACKGROUND OF THE INVENTION

1. Field of the Invention

The present invention relates to a clutch-lever manipulation assisting device interposed between a clutch lever and a clutch to add a pushing force of a biasing device to a manipulating force by the clutch lever.

2. Description of Related Art

Conventionally, clutches for motorcycles are constructed such that a crew grasps a clutch lever provided on a steering handle to effect disengagement. A manipulating force at the time of clutch operation is increased corresponding to a magnitude of a transfer torque of a clutch, that is, a magnitude of the output of an engine as mounted. Therefore, motorcycles mounting thereon an engine of high output are in some cases provided with a clutch-lever manipulation assisting device, in which a clutch operation is assisted by, for example, an elastic force of a spring at the time of a clutch operation in the case where the manipulating force is sharply increased.

With a conventional clutch-lever manipulation assisting device a biasing device that assists is coupled to a clutch-side operated lever (operated member) coupled to a clutch lever via a length of clutch wire. The biasing device includes an arm that turns together with the operated lever, and a compression coiled spring with one end thereof coupled to a turning end of the arm, and is constructed such that the operated lever is biased by an elastic force of the compression spring.

The compression coiled spring has the one end coupled to the turning end of the arm and has the other end thereof pivotally supported by a clutch-side support member. That is, in the case where both ends of the compression coiled spring and a turning center of the arm are positioned on a straight line, the elastic force of the compression coiled spring does not act in a direction, in which the arm turns, and the operated lever is not assisted, but the arm turns together with the operated lever upon manipulation of the clutch lever whereby the elastic force of the compression coiled spring is applied to the arm in a direction (a direction, in which the operated lever is turned by an operation of clutch disengagement), in which a turning angle increases. Therefore, the operation of clutch disengagement is performed by a resultant force of a manipulating force, with which the clutch lever is grasped, and the elastic force of the compression coiled spring.

Conventional clutch-lever manipulation assisting devices are constructed such that when an operated lever is turned to a position (referred to below as a clutch-meet position), in which a clutch is fully engaged, in a stroke of clutch engagement, a turning center of the operated lever (the arm described above) and both ends of the compression coiled spring are positioned on a straight line. This is because it is aimed at preventing a force, with which a friction plate of a clutch is pushed, from being decreased by the elastic force of the compression coiled spring when the clutch is in an engaged state.

In a stroke of clutch engagement, the clutch lever is returned to the clutch-meet position, thereafter swings by an amount, in which a so-called play is provided, further in a return direction, and returns to an initial position (referred below to as a return-finish position). At this time, the arm turns by that turning angle, which corresponds to the play of the clutch lever, in a direction of clutch engagement, and the arm is biased in the direction of clutch engagement by the elastic force of the compression of the coiled spring, so that a resultant force of an elastic force of a spring in the clutch and the elastic force of the compression of the coiled spring acts on the clutch lever in a state, in which the clutch lever is positioned in the return-finish position.

Conventional clutch-lever manipulation assisting devices include a biasing device that assists provided midway the length of a clutch wire as shown in FIGS. 12(a)–12(b) and 13(a)–13(c), in addition to one provided at a clutch-side end of the length of the clutch wire as described above.

A conventional clutch-lever manipulation assisting device 1 shown in FIG. 12(a) includes an arm 3 mounted at its turning end to a length of a clutch wire 2, and biasing device 4 coupled pivotally to the turning end of the arm 3. A base end of the arm 3 is pivotally supported by a spindle 5 on, for example, a vehicle frame of a motorcycle. The biasing device 4 includes a first rod 4a connected to the arm 3, a second rod 4b mounted on the includes a first rod 4a to be axially movable, and a compression spring 4c elastically mounted between the first rod 4a and the second rod 4b. A tip end of the second rod 4b is pivotally supported on the vehicle frame, or the like.

The clutch wire 2 is moved leftward in FIG. 12(a) by manipulating a clutch lever (not shown) in a direction, in which a clutch is disengaged. FIG. 12(a) is drawn in a state, in which the clutch lever is manipulated in a direction of clutch disengagement so that a manipulated amount becomes maximum, and the clutch lever is positioned in a so-called draw-finish position. The arm 3 is put in a position indicated by two-dot chain lines A in FIG. 12(a) when the clutch lever is positioned in a return-finish position, and turned to a position indicated by two-dot chain lines B when the clutch lever is positioned in a clutch-meet position. At the time of the clutch-meet position, both ends of the biasing device 4 and a center (spindle 5) of turning of the arm 3 are caused to be positioned on a straight line.

The conventional clutch-lever manipulation assisting device 1 shown in FIG. 12(a) opertates in the same manner as the conventional clutch-lever manipulation assisting device and the arm 3 turns leftward in the figure from a position indicated by B in the figure whereby an elastic force of the compression spring 4c is added to a manipulating force.

Since the biasing device 4 in the clutch-lever manipulation assisting device 1 is coupled to the arm 3 provided midway the clutch wire 2, the clutch lever is manipulated to the draw-finish position from the return-finish position whereby the clutch wire 2 will be pulled a length (output stroke) equal to a length (input stroke) pulled by the clutch lever as shown in FIG. 12(b).

Also, with the clutch-lever manipulation assisting device, a force (necessary input load) required for the clutch lever to effect clutch disengagement varies as shown in FIG. 12(c) corresponding to a manipulated amount (input stroke). In the figure, a clutch reaction force indicates an elastic force of a spring in the clutch, and an assist force indicates an elastic force of the compression spring 4c. Also, a reverse assist force means a force (a resultant force of the elastic force of the spring in the clutch and the elastic force of the compression spring 4c) that biases the clutch lever when the clutch lever is present in the return-finish position.

As shown in FIG. 12(c), a force (necessary input load) required for manipulating the clutch lever is increased at the start of manipulation so as to resist the reverse assist force and gradually decreased until the arm 3 reaches a position (clutch-meet position) indicated by the two-dot chain lines B in FIG. 12(a). After the arm 3 passes the clutch-meet position, the necessary input load is rapidly increased because a clutch reaction force acts on the clutch wire 2. Thereafter, until the clutch lever reaches the draw-finish position, the necessary input load is gradually decreased as the manipulated amount of the clutch lever is increased. Therefore, with the clutch-lever manipulation assisting device 1 shown in FIG. 12(a), a force must be applied twice to an arm that grasps the clutch lever, when the clutch should be disengaged. This phenomenon occurs likewise in the conventional clutch-lever manipulation assisting device.

On the other hand, a clutch-lever manipulation assisting device 6 shown in FIG. 13(a) is not provided with any compression coiled spring for the biasing purpose but constructed in a manner to dispense with a manipulation to moderate a force in the course of disengagement of the clutch. With the clutch-lever manipulation assisting device 6, the length of the clutch wire 9 on a clutch-lever side is coupled to a turning end of an arm 8, one end of which is pivotally supported on a vehicle frame, or the like by means of a spindle 7, and the length of clutch wire 10 on a clutch side is coupled to an intermediate portion of the arm 8. The arm 8 is put in a position indicated by two-dot chain lines A in FIG. 13(a) in a state, in which the clutch lever is positioned in a return-finish position, and put in a position indicated by two-dot chain lines B in FIG. 13(a) at at the time of clutch-meet.

That is, the clutch-lever manipulation assisting device 6 is configured so that a load at the time of a clutch operation is decreased by virtue of a so-called principle of lever. Therefore, with the clutch-lever manipulation assisting device 6, an output stroke amounts to about a half of an input stroke as shown in FIG. 13(b), and a necessary input load amounts to about a half of a clutch reaction force to become substantially constant as shown in FIG. 13(c).

The conventional clutch-lever manipulation assisting device and the clutch-lever manipulation assisting device 1 in FIG. 12(a) involve a problem that a person who performs manipulation is given a sense of incongruity since a necessary input load is once decreased and thereafter gradually increased in a stroke of clutch disengagement. This is because a manipulating force in common clutches for motorcycles is substantially constant when a clutch lever is manipulated from a return-finish position to a clutch-meet position and from the clutch-meet position to a draw-finish position.

Such disadvantage in manipulation can be dissolved by making use of the principle of lever as the clutch-lever manipulation assisting device 6 shown in FIG. 13(a). Since an output stroke amounts to about a half of an input stroke and there is a limit in increasing a manipulated amount of a clutch lever in the construction, however, there is a fear that the clutch cannot be fully disengaged.

The invention has been thought of in order to dissolve such problem, and an advantage of the present invention is to eliminate giving a sense of incongruity to an operator at the time of operating the clutch while adopting a construction, in which the biasing device assists clutch operations and to surely perform disengagement/engagement of a clutch.

SUMMARY OF THE INVENTION

In order to attain the advantage stated above, the invention provides an clutch-lever manipulation assisting device including an input member coupled to a side of a clutch lever, an output member connected to the input member via a connection device and coupled to an operated member of a clutch, and a biasing device that assists a manipulating force by the clutch lever. In the clutch-lever manipulation assisting device, the connection device is constructed such that a ratio of a moved amount of the output member to a moved amount of the input member varies in the course of a clutch operation.

According to the invention, it is possible to change an operating amount of the clutch relative to a manipulated amount of the clutch lever in the course of a clutch operation. Since a manipulating force, with which the clutch lever is manipulated, varies corresponding to an operating amount of the clutch, it is possible to enhance the degree of freedom in setting the manipulating force.

In the clutch-lever manipulation assisting device, the ratio of a moved amount of the output member to a moved amount of the input member is relatively small in the vicinity of a position (in the vicinity of a position, in which engagement of the clutch is terminated, in a stroke of clutch engagement), in which disengagement of the clutch begins in an operation of clutch disengagement, and the ratio of a moved amount of the output member to a moved amount of the input member is relatively increased in the vicinity of a position, in which a manipulated amount of the clutch lever is made maximum.

According to the invention, in the vicinity of a position, in which disengagement of the clutch begins in a stroke of clutch disengagement, the manipulating force can be decreased in the same manner as the case of making use of the principle of lever, so that at that time, an operation of the clutch becomes gentle relative to manipulation of the clutch lever. On the other hand, an operating amount of the clutch can be relatively increased in the vicinity of a position, in which a manipulated amount of the clutch lever is maximum.

In the clutch-lever manipulation assisting device a total moved amount of the output member is made substantially equal to a total moved amount of the input member.

In the clutch-lever manipulation assisting device according to the present invention, a moved amount of the operated member in the clutch when the clutch lever is manipulated from the return-finish position to the draw-finish position can be made substantially equal to a moved amount of an operated member in common clutches (ones, in which a clutch lever is directly coupled to a clutch through a length of clutch wire). Therefore, the clutch-lever manipulation assisting device according to an embodiment of the invention can be mounted to an existing clutch, in which a clutch lever is coupled to a clutch via a clutch wire, without any modification in the constitution of the clutch.

In the clutch-lever manipulation assisting device according to an embodiment of the present invention, a pushing force of the biasing device becomes zero in the vicinity of a position, in which engagement of the clutch is effected.

According to an embodiment of the invention, a force, with which a friction plate of the clutch is pushed, is not reduced by the pushing force of the biasing device although a configuration, in which a manipulating force of the clutch lever is assisted by the biasing device is adopted.

A counteracting spring is provided to counteract a pushing force of the biasing device that is generated in a state, in which the clutch lever is positioned in a return-side end, in a direction of clutch engagement.

According to an embodiment of the present invention, a so-called reverse assist force can be counteracted by an elastic force of the counteracting spring.

The counteracting spring is maintained in an energy-stored state even in a state, in which the clutch lever is manipulated to release a pushing force in the direction of clutch engagement.

According to an embodiment of the invention, both ends of the counteracting spring are restricted in position even at the time of maximum extension by its elastic force.

BRIEF DESCRIPTION OF THE DRAWINGS

FIGS. 9(a)–9(c) are side views showing a further embodiment of the clutch-lever manipulation assisting device.

FIGS. 13(a)–13(c) are views showing a conventional clutch-lever manipulation assisting device.

DETAILED DESCRIPTION OF THE PREFERRED EMBODIMENTS (First Embodiment)

An embodiment of a clutch-lever manipulation assisting device according to an embodiment of the present invention will be described below in detail with reference to FIGS. 1 to 8(d).

Figure 1:
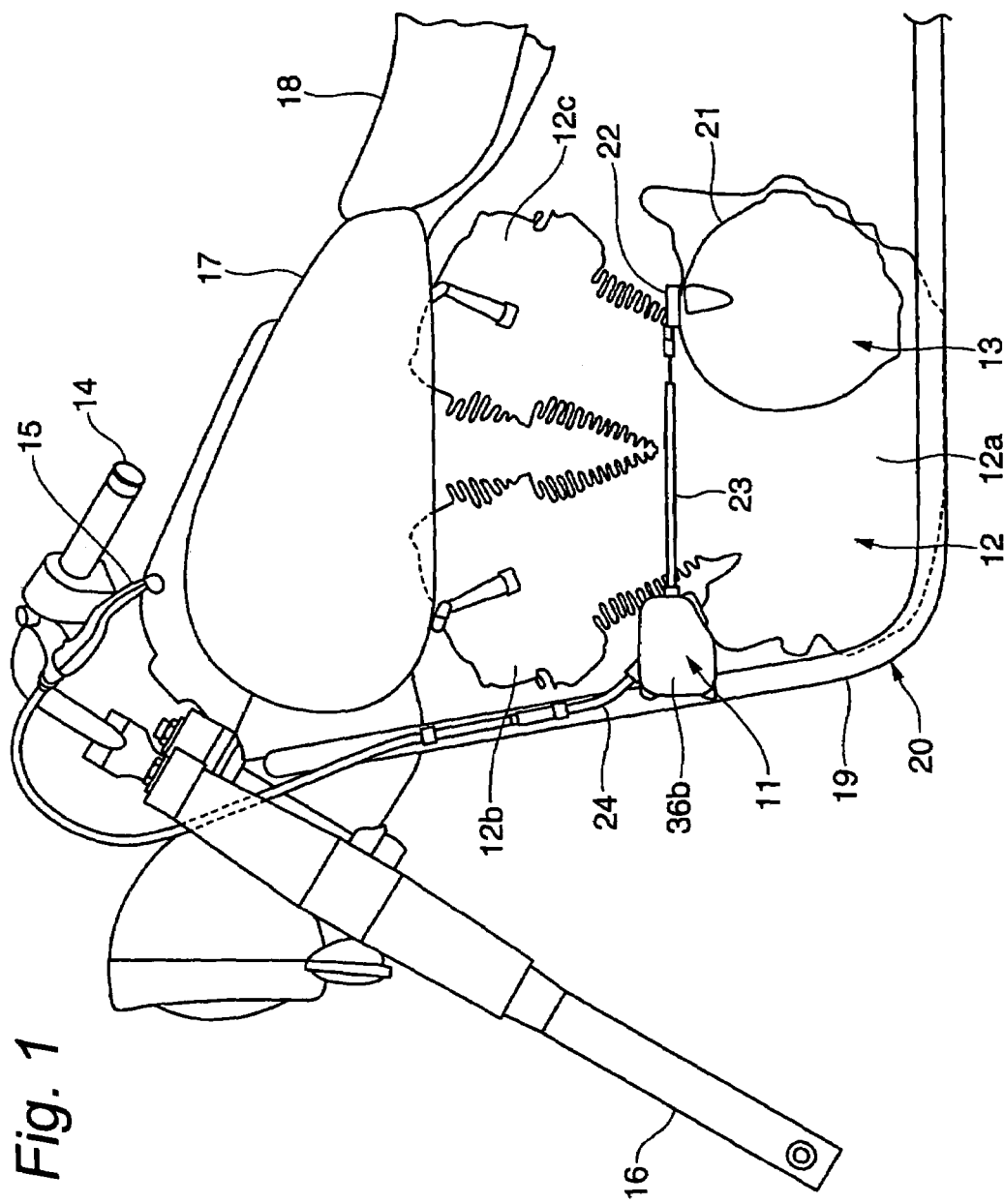
FIG. 1 is a side view showing a part of a motorcycle provided with a clutch-lever manipulation assisting device according to an embodiment of the present invention.
Figure 2:
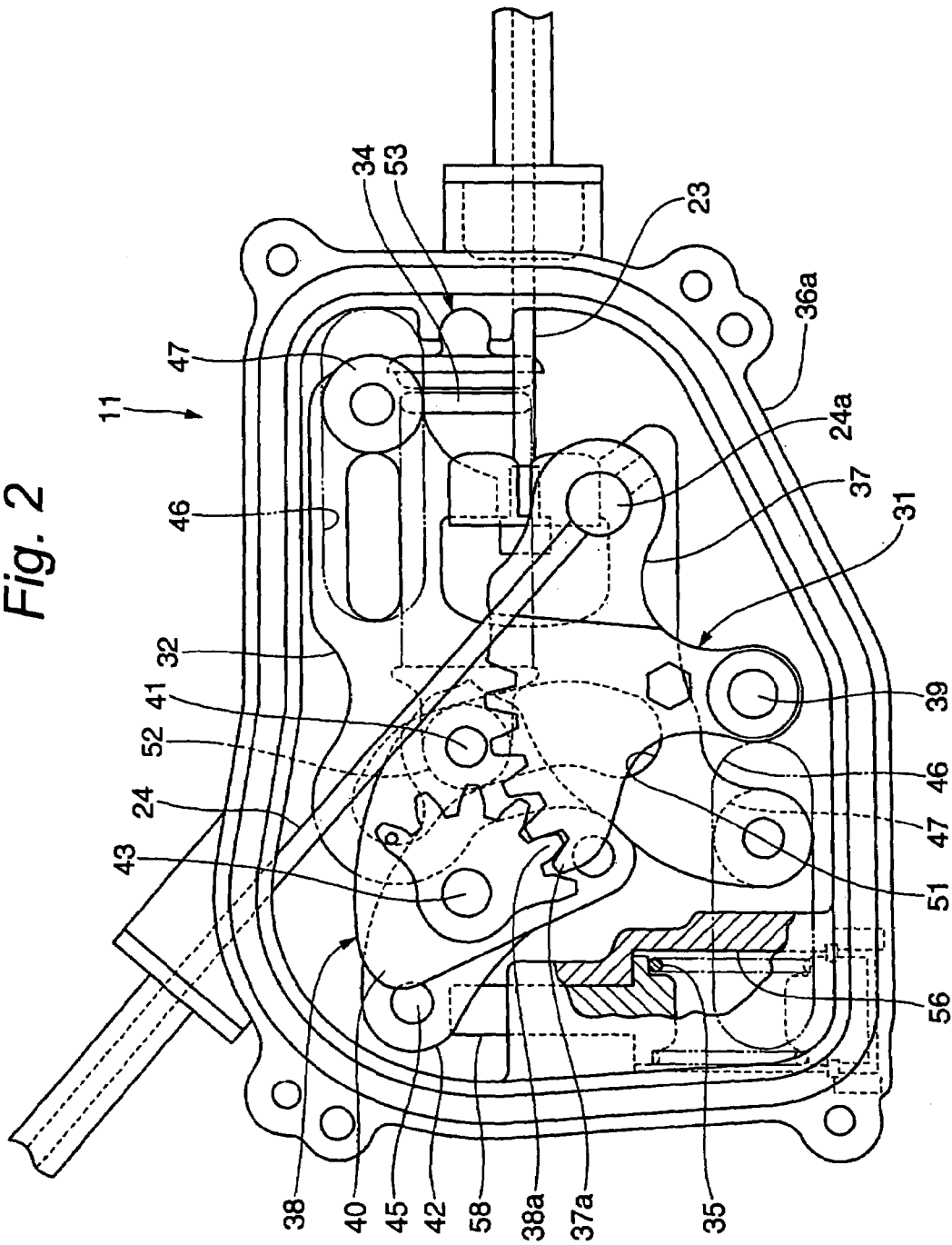
FIG. 2 is a side view showing, in enlarged scale, an essential part of the manipulation assisting device according to an embodiment of the present invention.
Figure 3:
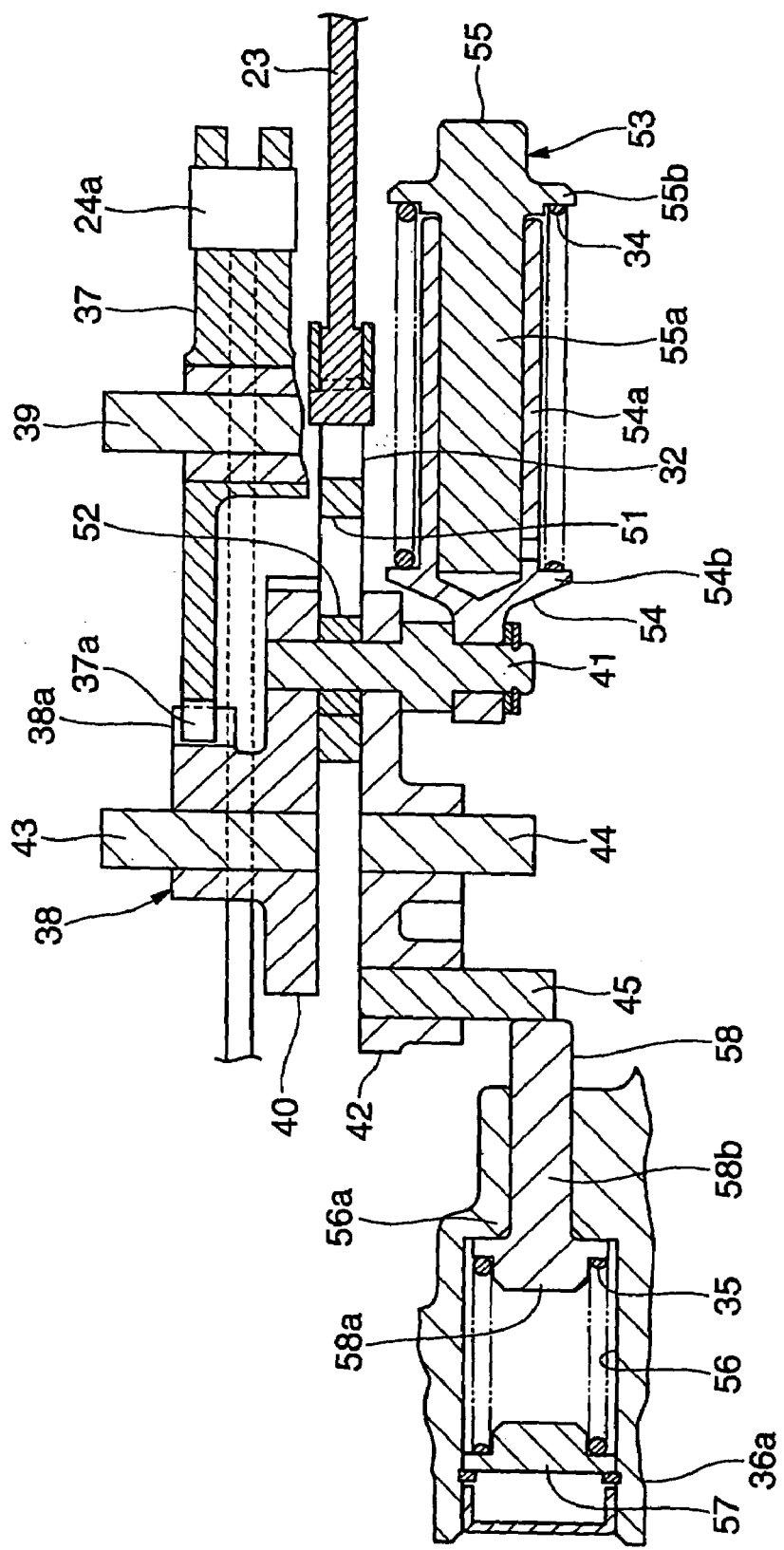
FIG. 3 is a cross sectional showing, in enlarged scale, an essential part of the manipulation assisting device according to an embodiment of the present invention.
Figure 4:
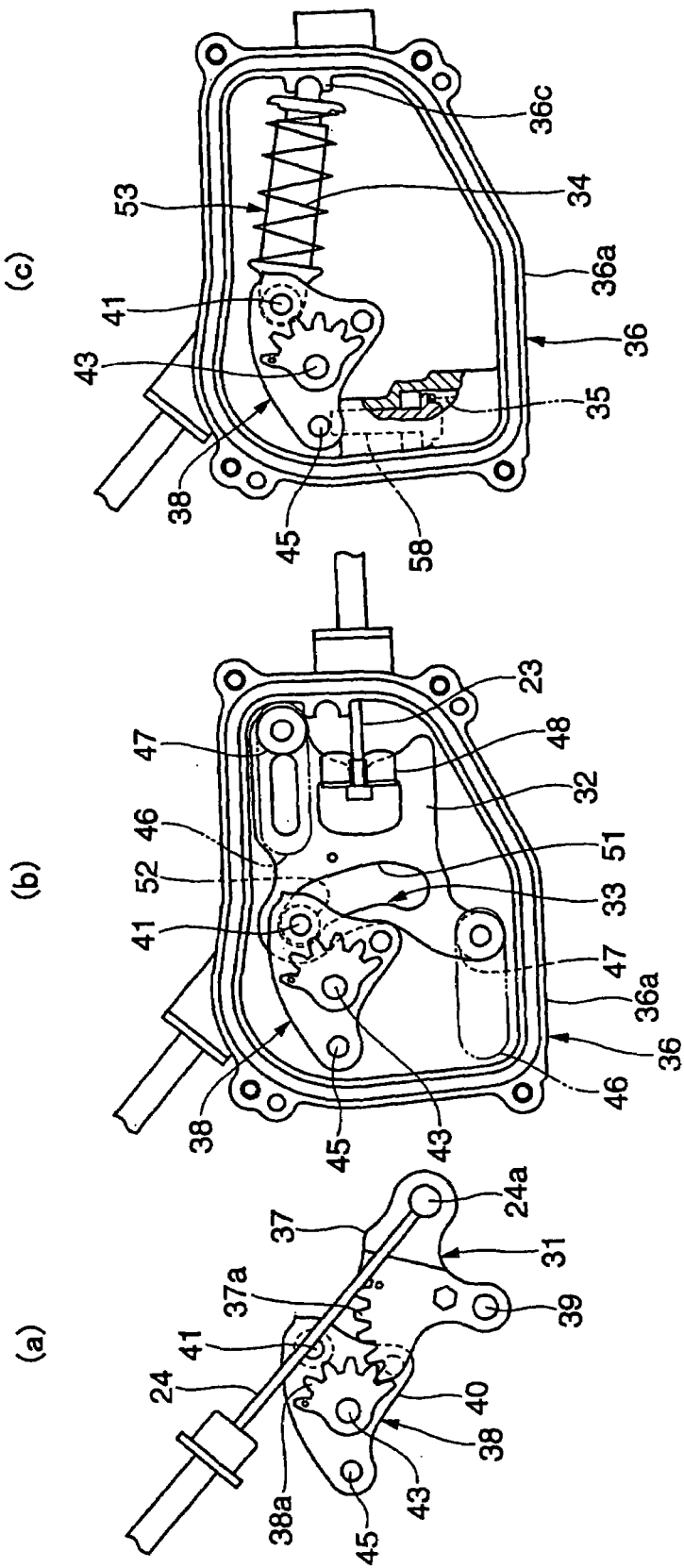
FIGS. 4(a)–4(c) are views illustrating actions of the manipulation assisting device according to an embodiment of the present invention.
Figure 5:
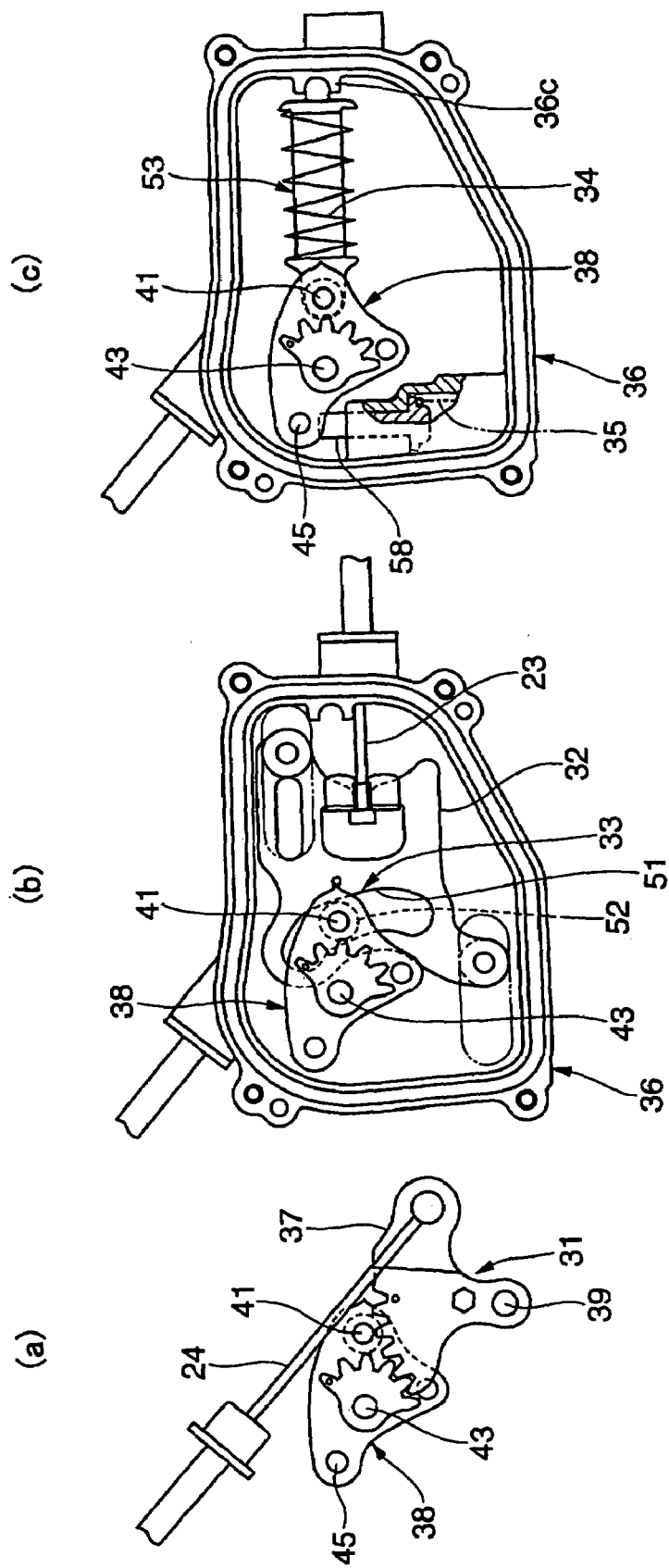
FIGS. 5(a)–5(c) are views illustrating actions of the manipulation assisting device according to an embodiment of the present invention.
Figure 6:
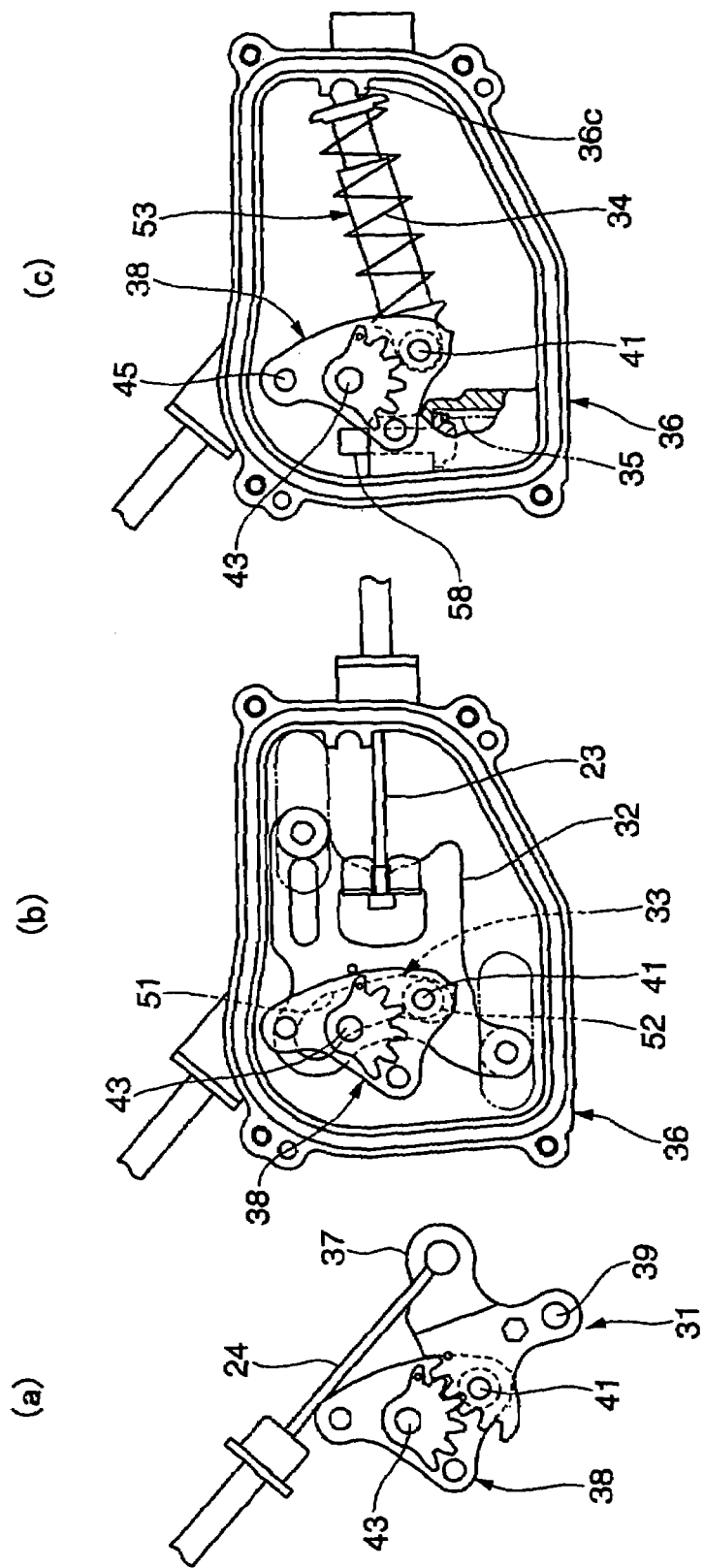
FIGS. 6(a)–6(c) are views illustrating actions of the manipulation assisting device according to an embodiment of the present invention.
Figure 7:
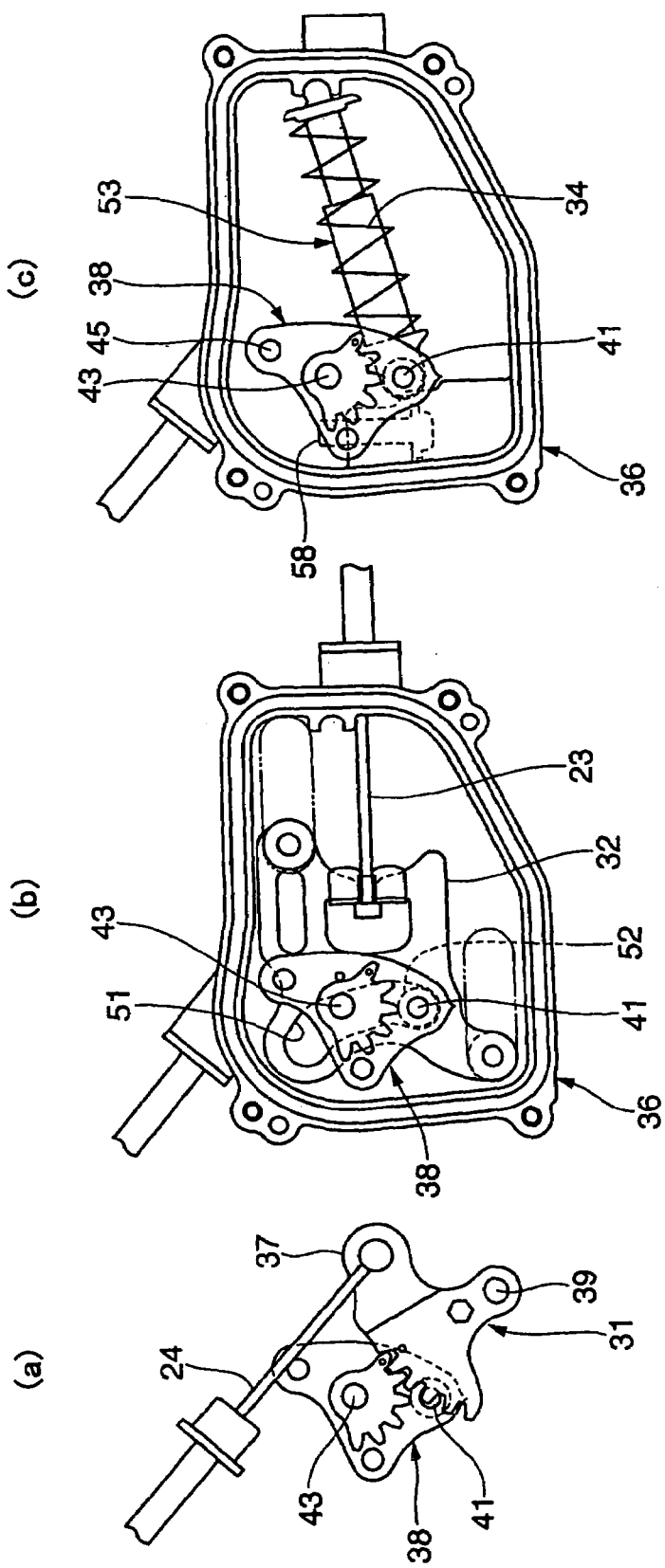
FIGS. 7(a)–7(c) are views illustrating actions of the manipulation assisting device according to an embodiment of the present invention.

FIG. 1 is a side view showing a part of a motorcycle provided with a clutch-lever manipulation assisting device according to an embodiment of the present invention, FIG. 2 is a side view showing, in enlarged scale, an essential part of the clutch-lever manipulation assisting device according to an embodiment of the present invention, and FIG. 3 is a cross sectional view showing the essential part. FIGS. 4(a) to 7(c) are views illustrating actions of the manipulation assisting device according to an embodiment of the present invention, FIGS. 4(a)–4(c) show a state, in which a clutch lever is positioned in an extension-finish position, FIGS. 5(a)–5(c) show a state at the time of clutch-meet, FIGS. 6(a)–6(c) show a state when the clutch is fully disengaged in a stroke of clutch disengagement, and FIGS. 7(a)–7(c) show a state when the clutch lever is positioned in a draw-finish position. In FIGS. 7(a)–7(c), one clutch-lever manipulation assisting device is depicted every constituent member in FIGS. 4(a)–4(c) for easily understanding the operating conditions. In these figures, FIG. 4(a) shows first and second input member and FIG. 4(b) shows the second input member and an output member and FIG. 4(c) shows the second input member, the biasing device, and a counteracting spring. FIGS. 8(a)–8(d) are graphs indicating characteristics of the manipulation assisting device according to an embodiment of the present invention. FIG. 8(a) indicates a variation of an output stroke relative to an input stroke, FIG. 8(b) indicates a variation of a necessary input load relative to an input stroke in the case where any biasing device is not provided, FIG. 8(c) indicates a variation of a necessary input load relative to an input stroke in the case where the biasing device is provided and FIG. 8(d) indicates a variation of a necessary input load relative to an input stroke in the case where a counteracting spring is provided.

In these figures, the reference numeral 11 denotes a clutch-lever manipulation assisting device according to the embodiment of the present invention. The clutch-lever manipulation assisting device 11 is mounted in a manipulating force transmission system between a clutch 13 of an engine 12 for motorcycles and a clutch lever 15 of a steering handle 14. In FIG. 1, reference numeral 16 denotes a front fork of a motorcycle, 17 a fuel tank, 18 a seat, and 19 a down tube on a vehicle frame 20. While only an external form is depicted in FIG. 1, the engine 12 is an air-cooled V-type 2-cylinder engine provided such that cylinders 12b, 12c' are arranged on a crankcase 12a to assume a V-shaped configuration as viewed in the lateral direction, and the clutch 13 is provided on an end of the crankcase 12a on a left side of a vehicle body. The clutch 13 is of a wet multi-disc type conventionally known and constructed such that an operated lever 22 (operated member) provided above a clutch cover 21 (see FIG. 1) is pulled by the manipulation assisting device 11 to put the clutch in a disengaged state and a force, with which the operated lever 22 is pulled, disappears to put the clutch in an engaged state.

The manipulation assisting device 11 according to the embodiment of the present invention is mounted, as shown in FIG. 1, on the down tube 19 through the medium of a bracket (not shown), and coupled to the operated lever 22 through the medium of an output-side clutch wire 23 and to the clutch lever 15 through the medium of an input-side clutch wire 24. Also, the manipulation assisting device 11 is arranged in a position at substantially the same level as that of the operated lever 22 so that the output-side clutch wire 23 extends in the lateral direction of lower ends of the cylinders 12b, 12c and substantially horizonal in a front-rear direction of the vehicle body.

The manipulation assisting device 11 includes as shown in FIGS. 2 to 7(c), an input member 31 coupled to the input-side clutch wire 24, an output member 32 coupled to the output-side clutch wire 23, a cam mechanism 33 (see FIG. 4(b)) that connects the input member 31 and the output member 32 to each other, an assistance compression spring 34, a counteracting compression spring 35 for counteracting the reverse assistance force, and a housing 36 that supports and receives these members. The housing 36 includes a housing body 36a formed to be box-shaped to be opened outside the vehicle body, and a cover body 36b (see FIG. 1) that covers an opened portion of the housing body 36a. The housing supports the respective members in a pivotal or reciprocatory manner.

The input member 31 includes as shown in FIG. 4(*a*), a first lever 37, with which an engagement 24a at a tip end of the input-side clutch wire 24 engages, and a second lever 38 coupled through gearing to the first lever 37. The first lever 37 is pivotally supported through a spindle 39 on the housing 36, has a pivotal end thereof engaged by the engagement 24a, and is formed with a gear 37a. Also, the first lever 37 is positioned in an outermost position (a position being upward in FIG. 3 and outermost of the vehicle body in a state, in which the housing 36 is mounted on the down tube 19) within the housing 36 as shown in FIG. 3.

The second lever 38 includes an outer plate 40 (see FIG. 3) formed integral with a gear 38a that meshes with the first lever 37, and an inner plate 42 joined integrally to the outer plate 40 through a connection pin 41. The outer plate 40 is pivotally supported through a spindle 43 on the cover body 36b. The inner plate 42 is pivotally supported through a spindle 44 (see FIG. 3) on the housing body 36a and a pressure receiving pin 45 described later is provided upright on that turning end of the inner plate, which is located on a front end of the vehicle body, to be directed in an inward of the vehicle body. The spindle 43 of the outer plate 40 and the spindle 44 of the inner plate 42 are positioned on the same axis.

A gear coupling portion for coupling of the first lever 37 and the second lever 38 adopts a configuration to increase the turning speed of the first lever 37 to transmit the same to the second lever 38. That is, when the input-side clutch wire 24 is pulled by the clutch lever 15, the first lever 37 turns on the spindle 39 counterclockwise as shown in FIG. 4(*b*) whereby the second lever 38 is turned on the spindles 43, 44 clockwise a larger angle than a turning angle of the first lever 37. The reason why the second lever 38 is increased in speed relative to the first lever 37 in this manner is that it is aimed at increasing an input amount of the cam mechanism 33 described later.

The output member 32 is formed to assume a plate-shape as shown in FIGS. 3 and 4(*b*), and held centrally in a widthwise direction of the housing body 36a by positioning pieces (not shown), which are formed on the housing 36 to extend in a thicknesswise direction, and a guide groove 46 in a manner to be movable only in the front-rear direction of the vehicle body. The positioning pieces are provided upright on the housing body 36a and the cover body 36b to face inward of the housing 36, tip ends of which positioning pieces are formed in a manner to slidably contact with front and back surfaces of the output member 32. The guide groove 46 includes a slot extending in the front-rear direction of the vehicle body, and a roller 47 rotatably provided on the output member 32 enters the guide groove in an engaging manner.

The output-side clutch wire 23 is latched through a pressure receiving plate 48 on a vertically central portion of an end of the output member 32 on a rear side of the vehicle body. That is, the output member 32 is moved leftward (toward a front side of the vehicle body) in FIGS. 2 and 4(*b*) whereby the output-side clutch wire 23 is pulled to cause disengagement of the clutch 13. In addition, the output-side clutch wire 23 is constantly pulled rightward in FIGS. 2 and 4(*b*) by an elastic force of a spring member that biases a friction plate in the clutch 13. Therefore, the output member 32 is positioned on a rearmost side end (return-finish position) of the vehicle body as shown in FIG. 4(*b*) in a state, in which the clutch lever 15 is not grasped by a crew.

Formed at an end of the output member 32 on a front side of the vehicle body is a cam groove 51 to connect thereto the second lever 38 of the input member 31. The cam groove 51 includes a slot curved to be convex rearwardly of the vehicle body as viewed from the lateral direction in FIG. 4(*b*), and the connection pin 41 of the second lever 38 is inserted into the cam groove. A cam follower 52 includes a roller rotatably mounted on the connection pin 41 as shown in FIG. 3. The cam mechanism 33 includes the cam follower 52 and the cam groove 51 constituting the connection device in the invention.

The manipulation assisting device 11 according to the embodiment of the present invention is constructed such that the cam follower 52 is positioned at an upper end of the cam groove 51 as shown in FIG. 4(*b*) in a state, in which the output member 32 is positioned in the return-finish position, and the second lever 38 turns to move the cam follower 52 clockwise about the spindles 43, 44 whereby the output member 32 is gradually moved toward the front side (side of clutch disengagement) of the vehicle body. The manipulation assisting device 11 is constructed to be put in a so-called play state until the cam follower 52 is moved from a position shown in FIG. 4(*b*) to a position (clutch-meet position) shown in FIG. 5(*b*). In this play state, the clutch 13 is kept in an engaged state even when the output-side clutch wire 23 is pulled by the output member 32. Also, the manipulation assisting device 11 is constructed such that the cam follower 52 passes the clutch-meet position shown in FIG. 5(*b*) to be moved to a position shown in FIG. 6(*b*) whereby the clutch 13 is put in a disengaged state, and that the cam follower 52 can be moved to a draw-finish position shown in FIG. 7(*b*) from the position of disengagement.

Figure 8:
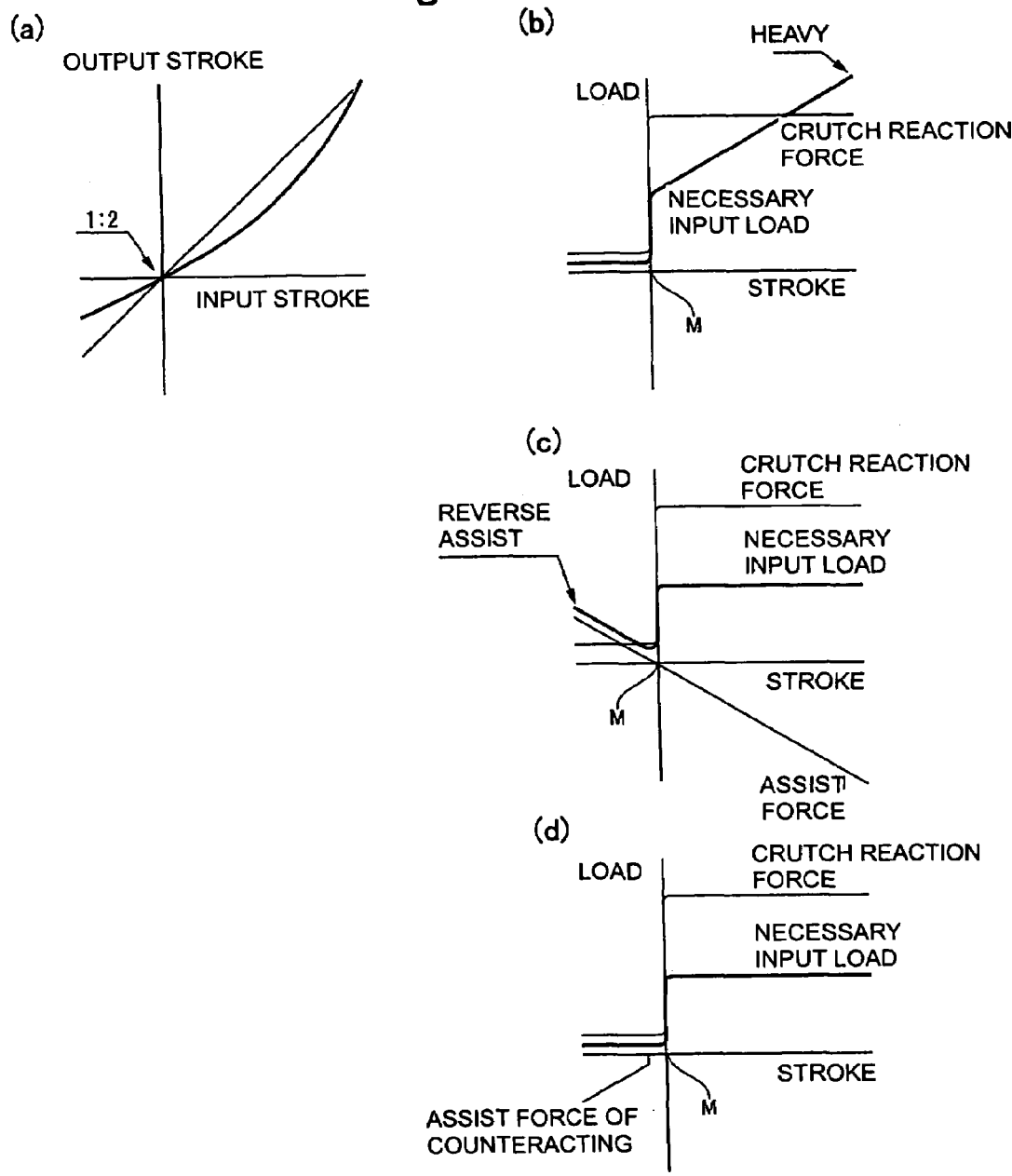
FIGS. 8(a)–8(d) are graphs indicating characteristics of the manipulation assisting device according to an embodiment of the present invention.

A cam profile of the cam groove 51 is configured such that a ratio of a moved amount (output stroke) of the output-side clutch wire 23 to a moved amount (input stroke) of the input-side clutch wire 24 is gradually increased as shown in FIG. 8(*a*). Stated in detail, setting is established such that in a manipulating region, in which the clutch lever reaches a position of disengagement shown in FIG. 6(*b*) via the clutch-meet position shown in FIG. 5(*b*) from the return-finish position shown in FIG. 4(*b*) in a stroke, in which the clutch lever 15 is grasped to cause disengagement of the clutch 13, a ratio of an output stroke to an input stroke becomes about 1/2 and an amount, by which the output-side clutch wire 23 is pulled, is decreased relative to a manipulated amount of the clutch lever 15. Also, setting is established such that in a manipulating region between the position of disengagement and the draw-finish position shown in FIG. 7(*b*), the ratio of an output stroke to an input stroke becomes about twice and an amount, by which the output-side clutch wire 23 is pulled, is increased relative to a manipulated amount of the clutch lever 15. Further, the cam mechanism 33 is configured such that a total moved amount of the output-side clutch wire 23 (output member 32) is made substantially equal to a total moved amount of the input-side clutch wire 24 (input member 31).

In this manner, the cam mechanism 33 including the cam groove 51 and the cam follower 52 is interposed between the input member 31 and the output member 32 whereby a load (necessary input load), at which the clutch lever 15 is manipulated, varies as shown in FIG. 8(*b*). FIG. 8(*b*) indicates changes of the load in a state, in which an elastic force of the compression spring 34 described later does not act. As seen from the figure, the necessary input load is relatively small to be constant in the play state before the clutch-meet position M is reached, and the necessary input load is rapidly increased because an elastic force (referred below to as clutch reaction force) of a spring in the clutch 13 acts when the clutch-meet position M is passed, and thereafter increased substantially in proportion to the input stroke. At the time of termination of manipulation, that is, at that time, when the clutch lever 15 reaches the vicinity of the draw-finish position, a moved amount of the output member 32 is relatively increased by the cam mechanism 33, so that the necessary input load exceeds the clutch reaction force. The manipulation assisting device 11 according to the embodiment is constructed such that the elastic force of the compression spring 34 is given in order to prevent the necessary input load from being increased than needed as described above to make manipulation so-called heavy.

The compression spring 34 is held by a spring holder 53 as shown in FIG. 3 and elastically mounted between the connection pin 41 and the housing body 36a with the spring holder 53 therebetween in a state of extending in the front-rear direction of the vehicle body. The compression spring 34 constitutes bias means in the invention.

The spring holder 53 includes a front half 54 and a rear half 55, which are connected to each other to be movable relative to each other in an axial direction of the compression spring 34. The front half 54 is formed with a cylinder 54a inserted inside the compression spring 34 and a load-bearing flange 54b, against which an end of the compression spring 34 on the front side of the vehicle body abuts, and a front end projecting toward the front side of the vehicle body from the compression spring 34 is pivotally mounted to an inner end of the connection pin 41, which projects inside the vehicle body from the inner plate 42.

The rear half 55 is formed with a rod 55a movably fitted into the cylinder 54a of the front half 54 and a load-bearing flange 55b, against which an end of the compression spring 34 on the rear side of the vehicle body abuts, and a rear end projecting toward the rear side of the vehicle body from the compression spring 34 is pivotally mounted to a mount seat 36c on the housing body 36a. In this manner, the compression spring 34 is interposed between the housing 36 and the connection pin 41 with the spring holder 53 therebetween, so that the cam follower 52 is constantly biased by the elastic force of the compression spring 34 in a direction, in which the compression spring 34 is extended.

The spring holder 53 is mounted on the housing 36 such that its axial direction is directed toward a pivotal center of the second lever 38 in a clutch-meet state as shown in FIG. 5(c). That is, the spindles 43, 44 of the second lever 38, the connection pin 41, and the rear and front ends of the spring holder 53 are positioned on a straight line as viewed in a lateral direction of FIG. 5(c), and so a force acting on the second lever 38 to turn the same becomes zero. By adopting this configuration, the elastic force of the compression spring 34 does not act on the clutch 13 when the clutch 13 is in the engaged state, so that a force pushing the friction plate in the clutch 13 can be prevented from being decreased by the elastic force of the compression spring 34.

With the manipulation assisting device 11 according to the embodiment of the present invention, in the case where the second lever 38 (cam follower 52) is positioned toward the return-finish position (see FIG. 4) from the clutch-meet position shown in FIG. 5(b), the second lever 38 is biased by the elastic force of the compression spring 34 in a direction opposed to one, in which the clutch 13 is disengaged. That is, in this case, a so-called reverse assistance force acts on the second lever 38. On the other hand, in the case where the second lever 38 is positioned toward the draw-finish position from the clutch-meet position shown in FIGS. 5(a)–5(c) (see FIGS. 6(a)–6(c) and 7(a)–7(c)), the second lever 38 is biased by the elastic force of the compression spring 34 in a direction, in which the clutch 13 is disengaged.

By providing the compression spring 34 in this manner, a necessary input load when the clutch 13 is disengaged varies as shown in FIG. 8(c). That is, as the reverse assistance force is generated, a necessary input load in the play state is increased, and when the clutch-meet position M is passed, the necessary input load is assisted by the elastic force of the compression spring 34 to be decreased thereby.

The manipulation assisting device 11 according to the embodiment of the present invention is constructed such that the ratio of an output stroke to an input stroke is gradually increased, and an mount, by which the elastic force of the compression spring 34 is increased as the input stroke is increased, is cancelled, so that the necessary input load after the clutch-meet position M is passed becomes substantially constant even when the input stroke changes. This is apparent from the fact that a necessary input load is gradually decreased in the conventional device shown in FIG. 13(c), that is, a device, in which an input stroke and an output stroke becomes constant in rate of change.

Since the reverse assistance force acts in a direction (direction of clutch engagement), in which operation is obstructed when the clutch 13 is disengaged, it is desirably made as small as possible in order to improve operability. Therefore, the manipulation assisting device 11 according to the embodiment of the present invention is provided, as shown in FIGS. 2 and 3, with the compression spring 35 that counteracts the reverse assistance force. The compression spring 35 that counteracts the reverse assistance force is inserted into a circular hole 56 formed in the housing body 36a to be elastically mounted between a plug member 57, which closes an opening on one end side of the circular hole 56, and a pressing pin 58 fitted into the other end side of the circular hole 56. An elastic force of the compression spring 35 that counteracts the reverse assistance force is set to be slightly smaller than an elastic force of the compression spring 34 that provides the reverse assistance force.

The circular hole 56 is formed in a position, in which the pressing pin 58 provided therein can push the pressure receiving pin 45 on the inner plate 42. The pressing pin 58 is formed integral with a large-diameter portion 58a that holds one end of the compression spring 34, and a small-diameter portion 58b that projects outside from the other end side of the circular hole 56 to push the pressure receiving pin 45. The large-diameter portion 58a is configured to abut against a step 56a of the circular hole 56 to be restricted in movement in a pressing direction (a direction, in which it is biased by the elastic force of the counteracting compression spring 35). A length of the small-diameter portion 58b is set to a dimension such that when the second lever 38 is positioned in the return-finish position shown in FIG. 4(c), the pressing pin 58 pushes the pressure receiving pin 45 and when the second lever 38 reaches the clutch-meet position shown in FIG. 5, the small-diameter portion 58b is separated from the pressure receiving pin 45.

That is, in a stroke, in which the clutch lever 15 is grasped to cause disengagement of the clutch 13, the second lever 38 is pushed (assisted) in a direction, in which the clutch 13 is disengaged by the elastic force of the compression spring 35 for counteracting the reverse assistance force, in a play state before the clutch reaction force is applied, so that the reverse assistance force is cancelled. In the case where the counteracting compression spring 35 is provided, a necessary input load changes as shown in FIG. 8(d). The necessary input load in this case assumes a constant value that is relatively small in a period of time for play.

The compression spring 35 that counteracts the reverse assistance force is formed to maintain an energy stored state even in a state, in which the pressing pin 58 is separate from the pressure receiving pin 45, that is, in a state, in which the clutch lever 15 is manipulated to release a pressing force (reverse assistance force) generated by the assistance compression spring 34 in the direction of clutch engagement. That is, as shown in FIG. 5(c), a compressed state is maintained even in a state, in which the pressing pin 58 is separate from the pressure receiving pin 45. By adopting such a configuration, both ends of the compression spring 35 that counteracts the reverse assistance force are restricted in position by its elastic force even at the time of maximum extension. Therefore, it is possible to prevent noise from being generated due to vibrations of the counteracting compression spring 35, the pressing pin 58, the plug member 57, or the like.

By grasping the clutch lever 15 in the clutch-lever manipulation assisting device 11 constructed in the manner described above, a manipulating force is transmitted via the input-side clutch wire 24 to the first lever 37 of the input member 31, and transmitted from the first lever 37 to the second lever 38 via the gears 37a, 38a. The second lever 38 is turned on the spindles 43, 44 to move the output member 32 toward the front side of the vehicle body (direction of clutch disengagement) through the medium of the cam mechanism 33 that includes the cam follower 52 and the cam groove 51. In this manner, the output member 32 is moved toward the front side of the vehicle body whereby the operated lever 22 of the clutch 13 is pulled through the output-side clutch wire 23, so that the clutch 13 is disengaged. Also, by releasing the clutch lever 15, the elastic force of the spring in the clutch 13 causes the respective members to be moved in a direction opposed to the direction described above, so that the clutch 13 is put in a state of engagement.

With the manipulation assisting device 11 according to the embodiment of the present invention, since the cam mechanism 33 constructed in a manner to change a ratio of a moved amount of the output member 32 to a moved amount of the input member 31 in the course of clutch operation is interposed between the input member 31 and the output member 32, an operating amount of the clutch 13 relative to a manipulated amount of the clutch lever 15 can be changed in the course of clutch operation as compared with the case where such ratio is substantially constant in conventional devices. Since a manipulating force, with which the clutch lever 15 is manipulated, increases or decreases corresponding to an operated amount of the clutch 13, the manipulation assisting device 11 according to the embodiment of the present invention is high in degree of freedom in setting of the manipulating force as compared with conventional devices.

Accordingly, since a manipulating force at the time of a clutch operation can be changed to get an approach to a sense of manipulation of conventional and common clutches, it is possible to manipulate the clutch lever 15 with a sense equivalent to that for common clutches while adopting a configuration, in which a clutch operation is assisted by the elastic force of the assistance compression spring 34.

The manipulation assisting device 11 according to the embodiment of the present invention is constructed such that a ratio of a moved amount of the output member 32 to a moved amount of the input member 31 is relatively small in the vicinity of a position, in which disengagement of the clutch 13 begins in a stroke, in which the clutch 13 is disengaged, and made relatively large in the vicinity of a position, in which a manipulated amount of the clutch lever 15 is maximum.

Accordingly, in the vicinity of a position (a position, in which engagement of the clutch 13 terminates, in a stroke, in which the clutch 13 is engaged), in which disengagement of the clutch 13 begins in a stroke of disengagement of the clutch 13, the manipulating force can be decreased in the same manner as the case of making use of the principle of lever, and an operation of the clutch 13 becomes gentle relative to manipulation of the clutch lever 15. Therefore, it is possible to easily control the clutch in an operating region, in which a half-clutched state comes out at the time of start, or the like. Also, since an operating amount of the clutch 13 becomes relatively large in the vicinity of a position, in which a manipulated amount of the clutch lever 15 is maximum, it is possible to dissolve insufficiency in the stroke of the clutch 13 to put the clutch 13 in a fully disengaged state.

Since the manipulation assisting device 11 according to the embodiment is constructed such that a total moved amount of the output member 32 is made substantially equal to a total moved amount of the input member 31, a moved amount of the operated member in the clutch 13 when the clutch lever 15 is manipulated from the return-finish position to the draw-finish position can be made substantially equal to a moved amount of an operated member in common clutches (ones, in which a clutch lever is directly coupled through a length of the clutch wire). Therefore, the manipulation assisting device 11 according to the embodiment of the present invention can be mounted on common clutches without any modification in its construction.

Since the manipulation assisting device 11 according to the embodiment of the present invention is constructed such that the pressing force of the assistance compression spring 34 becomes zero in the vicinity of a position, in which the clutch 13 is engaged, a force that pushes the friction plate in the clutch 13 is not reduced in spite of adopting a configuration, in which a manipulating force for the clutch lever 15 is assisted by the elastic force of the compression spring 34.

Since the manipulation assisting device 11 according to the embodiment of the present invention includes the counteracting compression spring 35 that counteracts the pressing force of the assistance compression spring 34 generated in a state, in which the clutch lever 15 is positioned in the return-finish position, and acting in the direction of clutch engagement, the reverse assistance force is cancelled by the elastic force of the counteracting compression spring 35, so that it is possible to smoothly manipulate the clutch lever 15 when an operation is performed to disengage the clutch. Also, since the counteracting compression spring 35 maintains an energy stored state even in a state, in which the clutch lever 15 is manipulated to cancel the pressing force in the direction of clutch engagement, both ends of the counteracting compression spring are restricted in position by its elastic force even at the time of maximum extension. Therefore, it is possible to prevent generation of vibrations and noise.

(Second Embodiment)

The clutch-lever manipulation assisting device according to the invention can be constructed in a manner shown in FIG. 9.

FIGS. 9(a)–9(c) are views showing a further embodiment of the clutch-lever manipulation assisting device, FIG. 9(a) shows a state in a return-finish position, FIG. 9(b) shows a state in a clutch-meet position, and FIG. 9(c) shows a state in a draw-finish position. In these figures, members being the same as, or equivalent to those illustrated in FIGS. 1 to 8(d) are denoted by the same reference numerals, and a detailed explanation therefor is suitably omitted.

The manipulation assisting device 71 shown in FIGS. 9(a) to 9(c) includes an input member 73 pivotally supported on a housing (not shown) by means of a spindle 72, an output member 75 pivotally supported on the input member 73 by means of a spindle 74, and the biasing device (not shown) that biases the input member 73. In the embodiment, the spindle 74 that connects the output member 75 to the input member 73 constitutes the connection means in the embodiment of the present invention.

Provided on the input member 73 is a connection pin 76 that restricts relative turning of the output member 75 relative to the input member 73 in the clutch-meet position and thereafter in a stroke, in which a clutch 13 is disengaged. Also, although not shown, the input member 73 is provided with the biasing device to assist a manipulating force, and a counteracting compression spring to counteract the reverse assistance force. The biasing device can make use of the same structure as that shown in the first embodiment.

The spindle 74 that connects the output member 75 to the input member 73 is arranged in a position, which is radially outwardly of a center of turning of the input member 73 and in which a lever ratio (an arm length of the input member 73/an arm length of the output member 75) of the both members in the return-finish position makes 1.8 as shown in FIG. 9(a). The manipulation assisting device 71 according to the embodiment of the present invention is constructed such that the lever ratio makes 1.99 in the clutch-meet position as shown in FIG. 9(b) and the lever ratio makes 0.67 in the draw-finish position as shown in FIG. 9(c).

That is, with the manipulation assisting device 71 according to the embodiment of the present invention, a ratio of a moved amount of the output member 75 to a moved amount of the input member 73 varies in the course of a clutch operation. Besides, the manipulation assisting device 71 is constructed such that a moved amount of the output member 75 is decreased relative to a moved amount of the input member 73 in the initial stage of operation in a stroke of disengagement of the clutch 13 and relatively increased in the final stage of operation.

Accordingly, by constituting the manipulation assisting device 71 in this manner, it is possible to produce an effect equivalent to that when the first embodiment is adopted.

(Third Embodiment)

Figure 10:
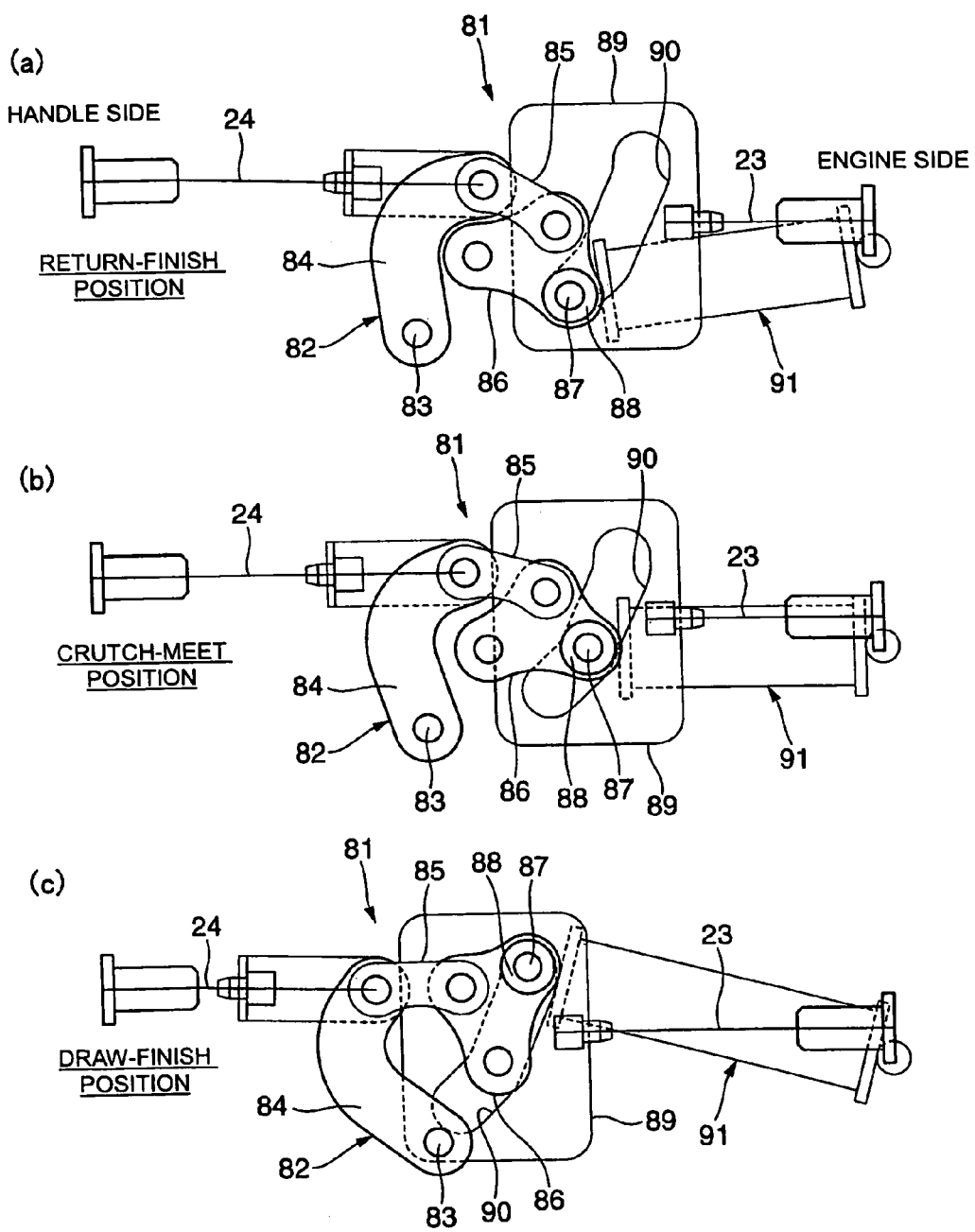
FIGS. 10(a)–10(c) are side views showing a still further embodiment of the clutch-lever manipulation assisting device.

The clutch-lever manipulation assisting device according to the invention can be constructed in a manner shown in FIGS. 10(a)–10(c).

FIGS. 10(a)–10(c) are side views showing a further embodiment of the clutch-lever manipulation assisting device, FIG. 10(a) shows a state in a return-finish position, FIG. 10(b) shows a state in a clutch-meet position, and FIG. 10(c) shows a state in a draw-finish position. In these figures, members being the same as, or equivalent to those illustrated in FIGS. 1 to 8(d) are denoted by the same reference numerals, and a detailed explanation therefor is suitably omitted.

An input member 82 in the manipulation assisting device 81 shown in FIGS. 10(a) to 10(c) includes a first lever 84 pivotally supported on a housing (not shown) by means of a spindle 83, and a second lever 86 pivotally connected via a link 85 to a turning end of the first lever 84. A cam follower 88 is pivotally mounted to that one end of the second lever 86, which is disposed away from the first lever 84 with the link 85 therebetween, by means of a spindle 87.

An output member 89 of the manipulation assisting device 81 is formed to be plate-shaped in the same manner as that shown in the first embodiment, and supported on a housing to be able to move in a right and left direction in FIGS. 10(a)–10(c). The output member 89 is formed with a cam groove 90 that includes a slot, and the cam follower 88 is fitted into the cam groove 90. That is, the output member 89 is connected to the input member 82 via the connection device that includes the cam groove 90 and the cam follower 88. Pivotally mounted to the spindle 87, which supports the cam follower 88, in the same manner as in the first embodiment is one end of the biasing device 91. The other end of the biasing device 91 is pivotally supported on the housing. While not shown, the biasing device 91 includes an assistance compression spring 34 and a spring holder 53, which are shown in the first embodiment. In addition, while not shown, a compression spring 35 that counteracts the reverse assistance force can be coupled to the second lever 86.

A cam mechanism that includes the cam groove 90 and the cam follower 88 is constructed such that a ratio of a moved amount of the output member 89 to a moved amount of the input member 82 varies in the course of a clutch operation, in the same manner as that in the case where the first embodiment is adopted. Further, the cam mechanism is constructed such that a moved amount of the output member 89 is decreased relative to a moved amount of the input member 82 in the initial stage of operation in a stroke of disengagement of the clutch 13 and relatively increased in the final stage of operation.

Accordingly, by constituting the manipulation assisting device 81 in this manner, it is possible to produce an effect equivalent to that when the first embodiment is adopted.

(Fourth Embodiment)

The clutch-lever manipulation assisting device according to the invention can be constructed in a manner shown in FIGS. 11(a)–11(c).

FIGS. 11(a)–11(c) are side views showing a further embodiment of the clutch-lever manipulation assisting device. FIG. 11(a) shows a state in a return-finish position, FIG. 11(b) shows a state in a clutch-meet position, and FIG. 11(c) shows a state in a draw-finish position. In these figures, members being the same as, or equivalent to those illustrated in FIGS. 1 to 8(d) are denoted by the same reference numerals, and a detailed explanation therefor is suitably omitted.

An input member 102 in the manipulation assisting device 101 shown in FIGS. 11(a) to 11(c) is formed to constitute a pulley, around which a tip end of the input-side clutch wire 24 is trained, the input member being pivotally supported on a housing (not shown) by means of a spindle 103. A cam follower 105 is rotatably mounted to that portion at a turning end of the input member 102, with which an engagement 24a of the input-side clutch wire 24 engages, through a spindle 104, and one end of bias device 106 is pivotally mounted to the portion in the same manner as that in the case where the first embodiment is adopted. The other end of the bias device 106 is pivotally mounted on the housing. While not shown, the bias device 106 includes an assistance compression spring 34 and a spring holder 53, which are shown in the first embodiment. In addition, while not shown, a compression spring 35 that counteracts the reverse assistance force can be coupled to the input member 102.

Figure 11:
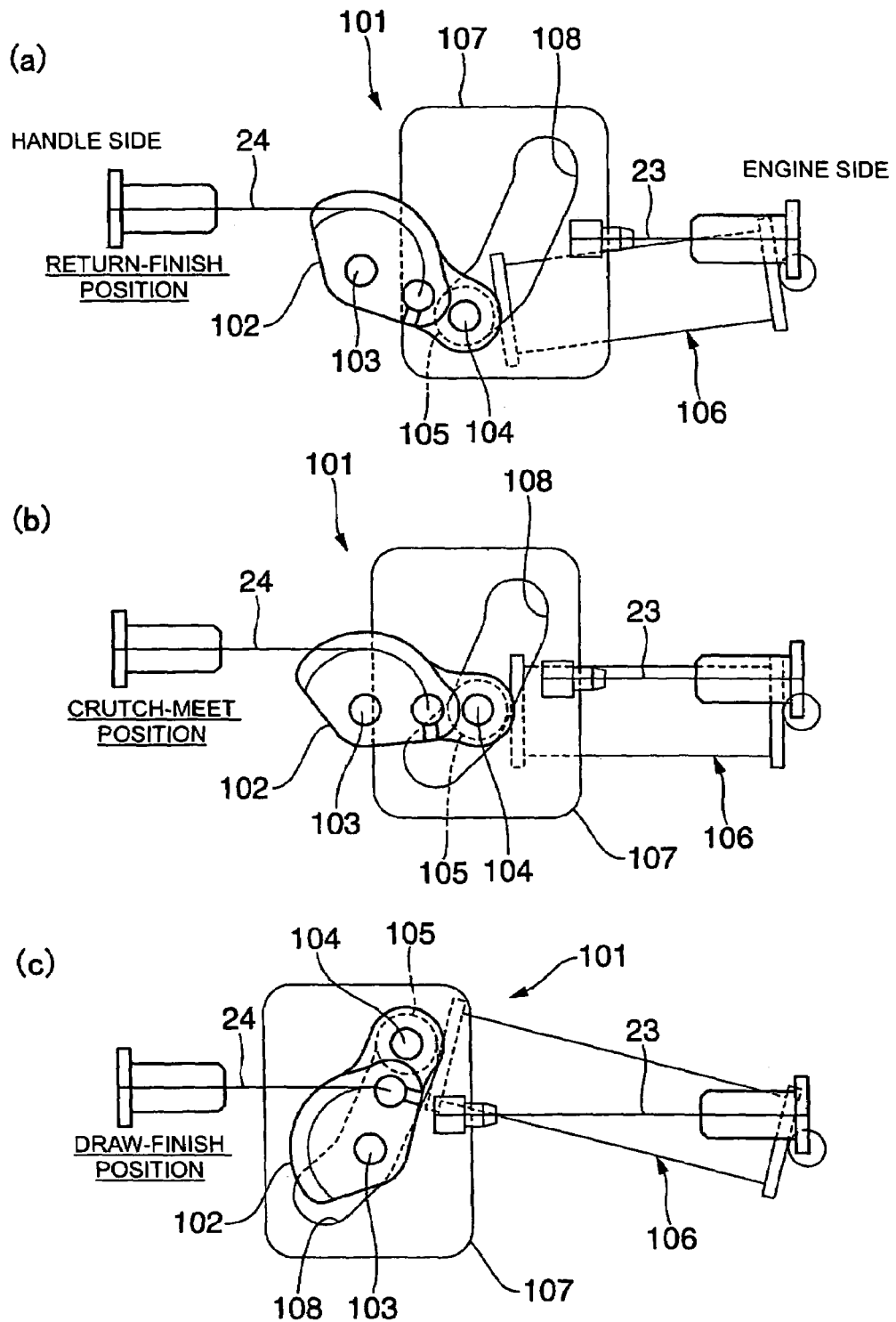
FIGS. 11(a)–11(c) are side views showing a further embodiment of the clutch-lever manipulation assisting device.
Figure 12:
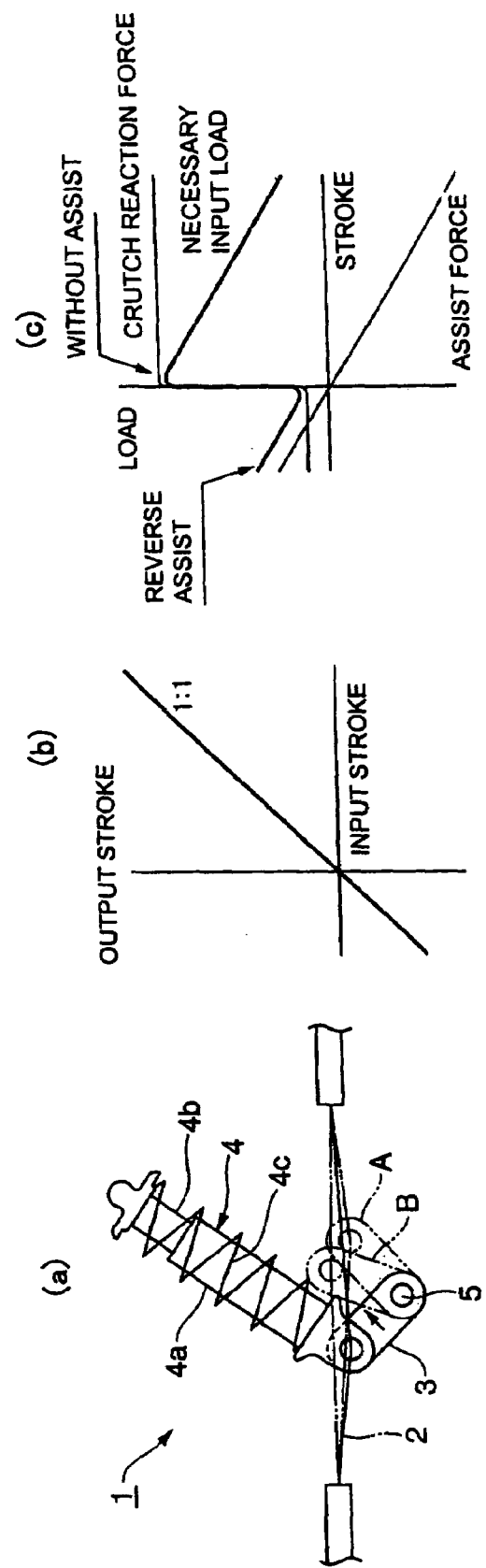
FIGS. 12(a)–12(c) are views showing a conventional clutch-lever manipulation assisting device.

An output member 107 of the manipulation assisting device 101 is formed to be plate-shaped in the same manner as that shown in the first embodiment, and supported on the housing to be able to move in a right and left direction as in FIGS. 11(*a*)–11(*c*). The output member 107 is formed with a cam groove 108 that includes a slot, and a cam follower 105 is fitted into the cam groove 108. That is, the output member 107 is connected to the input member 102 via a connection device that includes the cam groove 108 and the cam follower 105.

A cam mechanism that includes the cam groove 108 and the cam follower 105 is constructed such that a ratio of a moved amount of the output member 107 to a moved amount of the input member 102 varies in the course of clutch operation, in the same manner as that in the case where the first embodiment is adopted. Further, the cam mechanism is constructed such that a moved amount of the output member 107 is decreased relative to a moved amount of the input member 102 in the initial stage of operation in a stroke of disengagement of the clutch 13 and relatively increased in the final stage of operation.

Accordingly, by constituting the manipulation assisting device 101 in this manner, it is possible to produce an effect equivalent to that when the first embodiment is adopted.

While the respective embodiments have been illustrated, in which the clutch-lever manipulation assisting device according to the invention is used for motorcycles, the invention is not limited thereto but can be used for other vehicles.

According to the invention described above, the degree of freedom in setting a manipulating force can be enhanced by changing a ratio of a moved amount of the output member to a moved amount of the input member, so that a manipulating force at the time of a clutch operation can be changed to get an approach to a sense of manipulation of conventional and common clutches. Accordingly, it is possible to provide a clutch-lever manipulation assisting device that eliminates giving a sense of incongruity to an operator while adopting a configuration, in which clutch operation is assisted by the biasing device.

According to an embodiment of the present invention in the vicinity of a position, in which disengagement of a clutch begins in operation of a clutch disengagement, a manipulating force can be decreased in the same manner as the case of making use of the principle of lever, and an operation of the clutch becomes gentle relative to manipulation of the clutch lever. Therefore, it is possible to lightly and smoothly perform engagement/disengagement of a clutch. Also, since an operating amount of the clutch becomes relatively large in the vicinity of a position, in which a manipulated amount of the clutch lever is maximum, it is possible to dissolve insufficiency in a stroke of the clutch to put the clutch in a fully disengaged state.

Since the clutch-lever manipulation assisting device can be mounted to an existing clutch, in which a clutch lever is coupled to a clutch via a clutch wire, without any modification in the constitution of the clutch, it is possible to improve operability of the clutch while achieving reduction in cost.

According to an embodiment of the present invention, reduction in a transfer torque of the clutch can be prevented since a force, with which a friction plate of the clutch is pushed, is not reduced by a pressing force of the biasing device although a configuration, in which a manipulating force of the clutch lever is assisted by the biasing device is adopted.

According to an embodiment of the present invention, a clutch operation can be further easily performed since the counteracting spring can counteract a so-called reverse assistance force that is generated by the provision of the biasing device.

According to an embodiment of the present invention both ends of the counteracting spring are restricted in position by its elastic force even at the time of maximum extension, so that it can be prevented from generating noise when it comes into contact with other members due to vibrations.

What is claimed is:

1. A clutch-lever manipulation assisting device, comprising:
   a manipulating force transmission system comprising an input member coupled to a side of a clutch lever and an output member coupled to a clutch;
   bias means mounted to the manipulating force transmission system to assist a manipulating force by a clutch lever; and
   a housing that accommodates therein the bias means,
   wherein the housing introduces therein the manipulating force transmission system such that shaft centers of the input member and the output member intersect each other, and
   wherein the bias means is configured between the input member and the output member and assists the manipulating force transmission system within the housing.

2. The clutch-lever manipulation assisting device according to claim 1, wherein the manipulating force transmission system comprises:
   an input-side clutch wire coupled to the clutch lever; and
   wherein the input member is accommodated in the housing, pivotally supported through a spindle on the housing, and coupled to the input-side clutch wire.

3. The clutch-lever manipulation assisting device according to claim 2, wherein the bias means is connected to the input member.

4. The clutch-lever manipulation assisting device according to claim 2, wherein the input-side clutch wire is arranged along a down tube of a vehicle frame.

5. The clutch-lever manipulation assisting device according to claim 2, wherein the input member is formed to constitute a pulley, around which a tip end of the input-side clutch wire is wound.

6. The clutch-lever manipulation assisting device according to claim 5, wherein the pulley of the input member is formed to be substantially sector-shaped.

7. The clutch-lever manipulation assisting device according to claim 1, wherein the manipulating force transmission system comprises:
   an output-side clutch wire coupled to a clutch; and
   wherein the output member is accommodated in the housing, pivotally supported through a spindle on the housing, and coupled to the output-side clutch wire.

8. The clutch-lever manipulation assisting device according to claim 7, wherein the output-side clutch wire extends substantially horizontally.

9. The clutch-lever manipulation assisting device, according to claim 1, wherein the device is mounted to a down tube of a vehicle frame through a bracket.

10. The clutch-lever manipulation assisting device, according to claim 1, wherein the device is arranged in a position of substantially the same level as that of an operated member of a clutch.

11. The clutch-lever manipulation assisting device, according to claim 1, wherein the bias means is mounted to the manipulating force transmission system between the clutch and the clutch lever.

12. A vehicle, comprising:
a clutch;
a clutch lever provided on a bar type handle;
a manipulating force transmission system comprising an input member coupled to a side of the clutch lever and an output member coupled to the clutch;
bias means mounted to the manipulating force transmission system between the clutch and the clutch lever to assist a manipulating force by the clutch lever; and
a housing that accommodates therein the bias means,
wherein the housing introduces therein the manipulating force transmission system such that shaft centers of the input member and the output member intersect each other, and
wherein the bias means assists the manipulating force transmission system within the housing.

13. The vehicle according to claim 12, wherein the manipulating force transmission system comprises:

an input-side clutch wire coupled to the clutch lever; and
wherein the input member is accommodated in the housing, pivotally supported through a spindle on the housing, and coupled to the input-side clutch wire.

14. The vehicle according to claim 13, wherein the bias means is connected to the input member.

15. The vehicle according to claim 13, wherein the input-side clutch wire is arranged along a down tube of a vehicle frame.

16. The vehicle according to claim 13, wherein the input member is formed to constitute a pulley, around which a tip end of the input-side clutch wire is wound.

17. The vehicle according to claim 16, wherein the pulley of the input member is formed to be substantially sector-shaped.

18. The vehicle according to claim 12, wherein the manipulating force transmission system comprises:
an output-side clutch wire coupled to the clutch; and
wherein the output member is accommodated in the housing, pivotally supported through a spindle on the housing, and coupled to the output-side clutch wire.

19. The vehicle according to claim 18, wherein the output-side clutch wire extends substantially horizontally.

* * * * *